US008626240B2

(12) United States Patent
Giustina et al.

(10) Patent No.: US 8,626,240 B2
(45) Date of Patent: Jan. 7, 2014

(54) LOCATION OF BASESTATION

(75) Inventors: Andrea Giustina, Milan (IT); Edward Hatala, Wilshire (GB)

(73) Assignee: Ubiquisys Limited, Swindon (GB)

( * ) Notice: Subject to any disclaimer, the term of this patent is extended or adjusted under 35 U.S.C. 154(b) by 0 days.

(21) Appl. No.: 13/430,496

(22) Filed: Mar. 26, 2012

(65) Prior Publication Data

US 2012/0184303 A1    Jul. 19, 2012

Related U.S. Application Data

(63) Continuation of application No. 11/801,424, filed on May 8, 2007, now abandoned.

(30) Foreign Application Priority Data

Feb. 2, 2007 (GB) .................................. 0702095.1
Feb. 2, 2007 (GB) .................................. 1114396.3

(51) Int. Cl.
*H04B 1/38* (2006.01)

(52) U.S. Cl.
USPC ...................... 455/561; 455/452.1; 455/456.2

(58) Field of Classification Search
USPC ........... 455/404.1–404.2, 410–411, 418–424, 455/446, 456.1–456.6, 561; 370/254–258, 370/276–282, 293–296, 328–338
See application file for complete search history.

(56) References Cited

U.S. PATENT DOCUMENTS

| 5,170,426 | A | 12/1992 | D'Alessio et al. |
| 5,778,322 | A | 7/1998 | Rydbeck |
| 6,070,083 | A | 5/2000 | Watters et al. |
| 7,184,770 | B1 * | 2/2007 | Narasimhan et al. ......... 455/446 |
| 7,676,216 | B2 * | 3/2010 | Stieglitz et al. ............... 455/410 |
| 2002/0077115 | A1 | 6/2002 | Ruutu et al. |
| 2003/0040323 | A1 | 2/2003 | Pihl et al. |
| 2003/0125046 | A1 | 7/2003 | Riley |
| 2004/0023640 | A1 | 2/2004 | Ballai |
| 2004/0180670 | A1 | 9/2004 | Pande |
| 2004/0204097 | A1 | 10/2004 | Scheinert et al. |
| 2005/0026650 | A1 | 2/2005 | Russell |

(Continued)

FOREIGN PATENT DOCUMENTS

| EP | 1365609 | 11/2003 |
| EP | 1763178 | 3/2007 |

(Continued)

OTHER PUBLICATIONS

UK Intellectual Property Office Search Report dated Nov. 22, 2010 issued in GB0702095.1.

(Continued)

*Primary Examiner* — Kashif Siddiqui
(74) *Attorney, Agent, or Firm* — Weaver Austin Villeneuve & Sampson LLP

(57) ABSTRACT

Techniques and mechanisms relating to a basestation for a cellular communication system, and in particular to a method and a system for determining the location of the basestation, are disclosed. Methods are provided for use in a basestation of a mobile communications network, or in the network itself, for determining information about the position of the basestation itself, and/or for determining the position of mobile devices having a connection to the basestation. According to other aspects of the invention, there are provided basestations and network nodes for performing these methods.

14 Claims, 4 Drawing Sheets

(56) References Cited

U.S. PATENT DOCUMENTS

| | | |
|---|---|---|
| 2005/0136911 A1 | 6/2005 | Csapo et al. |
| 2005/0254474 A1 | 11/2005 | Iyer et al. |
| 2005/0255890 A1 | 11/2005 | Nakada |
| 2006/0193299 A1 | 8/2006 | Winget et al. |
| 2006/0203762 A1 | 9/2006 | Taubenheim et al. |
| 2006/0211431 A1* | 9/2006 | Mansour et al. ............ 455/456.2 |
| 2006/0270349 A1 | 11/2006 | Overy et al. |
| 2007/0286143 A1* | 12/2007 | Olson et al. .................... 370/338 |
| 2008/0085722 A1* | 4/2008 | Hirano et al. ............... 455/452.1 |
| 2008/0130529 A1* | 6/2008 | Khandekar et al. ........... 370/296 |
| 2008/0188243 A1 | 8/2008 | Giustina et al. |
| 2009/0149194 A1* | 6/2009 | Howard ..................... 455/456.1 |
| 2010/0067482 A1 | 3/2010 | Vikberg et al. |
| 2010/0075658 A1* | 3/2010 | Hou et al. ................... 455/422.1 |
| 2012/0015649 A1* | 1/2012 | Li et al. ......................... 455/434 |
| 2012/0270561 A1 | 10/2012 | Giustina et al. |

FOREIGN PATENT DOCUMENTS

| | | |
|---|---|---|
| EP | 2077050 | 7/2009 |
| GB | 2316823 A | 3/1998 |
| GB | 2338374 A | 12/1999 |
| GB | 2363293 A | 12/2001 |
| GB | 2367452 A | 4/2002 |
| GB | 2386014 A | 9/2003 |
| GB | 2386801 A | 9/2003 |
| JP | H08-088878 | 4/1996 |
| JP | 2000-244965 | 9/2000 |
| JP | 2001-309421 | 11/2001 |
| JP | 2003274011 | 9/2003 |
| JP | 2005-328152 | 11/2005 |
| JP | 2006-279854 | 10/2006 |
| WO | WO 99/61934 | 12/1999 |
| WO | WO 00/73814 A1 | 12/2000 |
| WO | WO 02/15614 A1 | 2/2002 |
| WO | WO 03010552 | 2/2003 |
| WO | WO 03/071303 A1 | 8/2003 |
| WO | WO2004/042609 | 5/2004 |
| WO | WO 2005/002124 A3 | 1/2005 |
| WO | WO2007/002416 | 1/2007 |
| WO | WO2008/045366 | 4/2008 |

OTHER PUBLICATIONS

UK Intellectual Property Office Search Report dated Jun. 2, 2011 issued in GB0702095.1.
UK Intellectual Property Office Search Report dated Sep. 7, 2011 issued in GB0702095.1.
UK Intellectual Property Office Search Report dated Sep. 7, 2011 issued in GB1114401.1.
UK Intellectual Property Office Search Report dated Sep. 7, 2011 issued in GB1114396.3.
UK Intellectual Property Office Search Report dated Sep. 7, 2011 issued in GB1114398.9.
United Kingdom Search Report dated Jun. 18, 2007, for related GB Application No. 0702095.1.
International Search Report and Written Opinion dated Aug. 5, 2008 for corresponding international application No. PCT/GB2008/000343.
Nonfinal Office Action dated Jul. 20, 2010, U.S. Appl. No. 11/801,424.
Final Office Action dated Apr. 6, 2011, U.S. Appl. No. 11/801,424.
Nonfinal Office Action dated Dec. 29, 2011, U.S. Appl. No. 11/801,424.
EP First Examination Report dated Jul. 27, 2012, EP Application No. 08 702 010.3—1525.
Japanese Office Action dated Apr. 27, 2012, JP Application No. 2009-547762.
U.S. Office Action dated Mar. 1, 2013 issued in U.S. Appl. No. 13/539,059.
Japanese Office Action dated Jan. 18, 2013 issued in JP Application No. 2009-547762.

* cited by examiner

LOCATION OF BASESTATION

This application is a continuation application and claims priority from U.S. patent application Ser. No. 11/801,424, entitled "Location of Basestation," by Giustina et al, filed on May 8, 2007, which claims priority to GB Application No. 0702095.1, filed Feb. 2, 2007, and GB Application No. 1114396.3, filed Feb. 2, 2007, each of which is incorporated herein by reference in their entirety for all purposes.

This invention relates to a basestation for a cellular communication system, and in particular to a method and a system for determining the location of the basestation.

There are situations in which it may be essential or highly desirable to know the position of a basestation in a cellular communication system. For example, when an emergency call is made through the basestation, it may be a requirement that the emergency services be informed of the location of the basestation, in order that they can attend the emergency. In addition, knowing the location of the basestation, and hence knowing at least approximately the location of a mobile device that has a connection to that basestation, allows the mobile network operator to offer location-based services to the mobile device user.

In existing cellular communication systems, basestations are constructed and commissioned by the mobile network operators themselves, and so the mobile network operators always know exactly where the basestations are located.

Femtocell basestations are now proposed, which can be purchased by consumers for use within their own homes or offices, using their own existing broadband internet connection to provide backhaul into the core network of the mobile network operator. In such situations, the mobile network operator may not know where exactly the femtocell basestation has been positioned.

According to the present invention, there are provided methods for use in a basestation of a mobile communications network, or in the network itself, for determining information about the position of the basestation itself, and for determining the position of mobile devices having a connection to the basestation. Where the basestation has a small coverage area, information about the position of the basestation can be taken as an acceptably accurate estimate of the position of the mobile device and, conversely, information about the position of the mobile device can be taken as an acceptably accurate estimate of the position of the basestation.

According to other aspects of the invention, there are provided basestations and network nodes for performing these methods.

Figure 1:
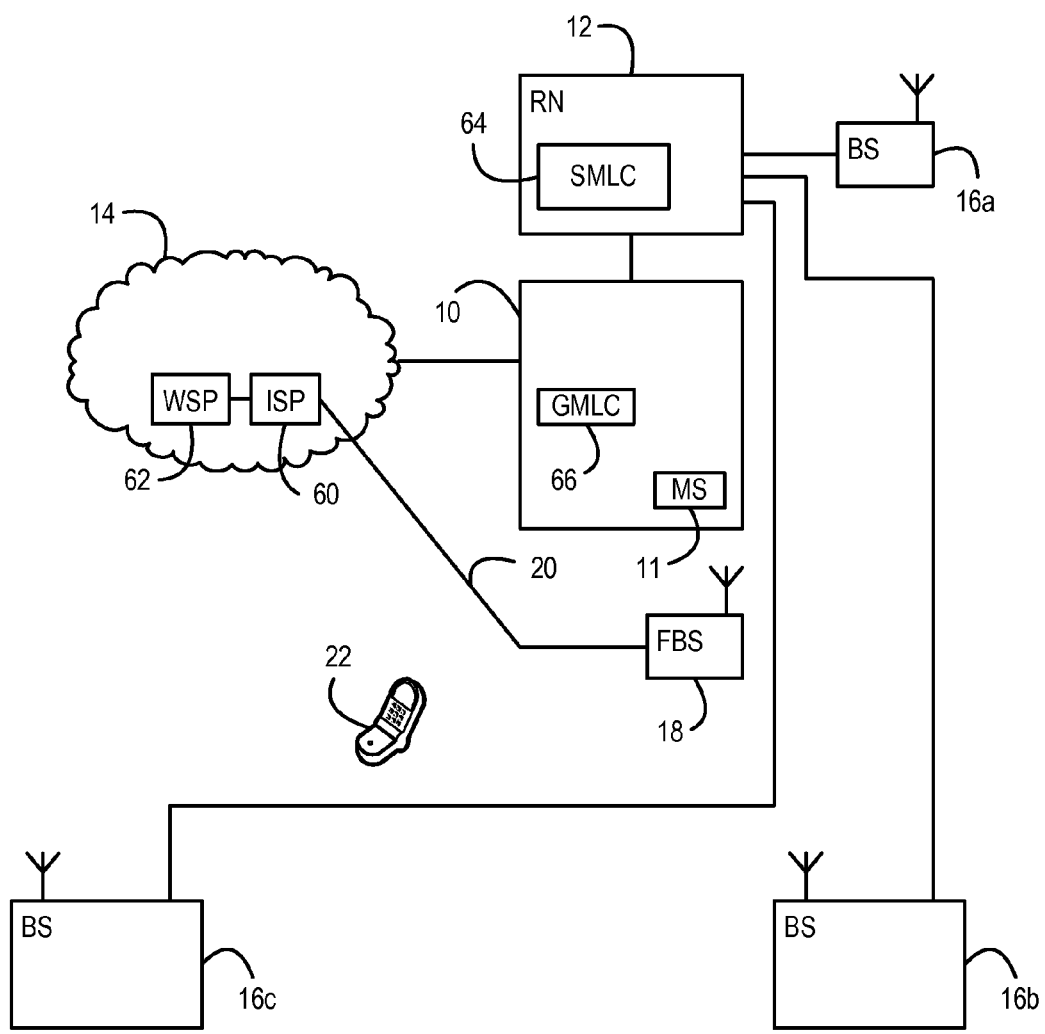
FIG. 1 is a block schematic diagram, illustrating a part of a cellular wireless communications network in accordance with an aspect of the present invention.

FIG. 1 illustrates a part of a cellular wireless communications network in accordance with an aspect of the present invention. Specifically, FIG. 1 shows a core network (CN) 10 and a radio network (RN) 12 of a cellular wireless communications network. These are generally conventional, and are illustrated and described herein only to the limited extent necessary for an understanding of the present invention.

Thus, the core network 10 has connections into the Public Switched Telephone Network (PSTN) (not shown) and into a packet data network, for example the internet 14. The radio network 12 may include, for example, a GSM radio network and/or a UMTS radio network, which are then generally conventional. As shown in FIG. 1, the radio network 12 has a number of basestations (BS) 16a, 16b, 16c connected thereto.

As will be recognized by the person skilled in the art, a typical radio network 12 will have many such basestations connected thereto. These basestations provide coverage over respective geographic areas, or cells, such that a service is available to subscribers. Often, there is a group of basestations that together provide coverage to the whole of the intended service area, while other basestations provide additional coverage to smaller areas within that intended service area, in particular to smaller areas where there is expected to be more demand for the service. The cells served by the basestations of the first group are then referred to as macrocells, while the smaller areas served by the additional basestations are referred to as microcells.

FIG. 1 also shows an additional basestation 18 that can be used to provide coverage over a very small area, for example within a single home or office building. This is referred to as a femtocell basestation (FBS). The femtocell basestation 18 is available for purchase by a customer from a general retail outlet and, after purchase, can be connected into the mobile network operator's core network 10 over the internet 14, by means of the customer's existing broadband internet connection 20. Thus, a user of a conventional mobile phone 22 can establish a connection through the femtocell basestation 18 with another device, in the same way that any other mobile phone can establish a connection through one of the other basestations of the mobile network operator's network, such as the basestations 16a, 16b, 16c.

As shown in FIG. 1, the core network 10 includes a management system (MS) 11, which is provided specifically for managing the femtocell basestation 18 and the other femtocell basestations that are active in the network.

As mentioned above, the macrocell basestations provide coverage to the whole of the intended service area including the location of the femtocell basestation 18 and the location of the mobile phone 22 while it is in the coverage area of the femtocell basestation 18.

This property is used in aspects of the present invention, as will be described in more detail below.

In one embodiment of the invention, the customer's broadband internet connection 20 is provided by an internet service provider (ISP) 60 over infrastructure provided by a wholesale service provider (WSP) 62 using DSL (Digital Subscriber Line) technology, the same infrastructure being used to make landline telephone calls. Each broadband line, such as the line 20, is identified by a Manufacturers Authentication Code (MAC), while the internet service provider (ISP) knows the customer's IP address. At the same time, the line is identified by a Calling Line Identity (CLI), which is used to indicate the customer's landline telephone number. There is a mapping between the Manufacturers Authentication Code (MAC) and the Calling Line Identity (CLI), and at least one of the internet service provider (ISP) and the wholesale service provider (WSP) is able to associate at least one of the Manufacturers Authentication Code (MAC) and the Calling Line Identity (CLI) with the customer's physical address.

In one embodiment of the invention, therefore, the physical location of the femtocell basestation 18 can be determined from the IP address that it is using.

In this and other embodiments of the invention, the physical location of the femtocell basestation can be determined periodically, and an alert can be provided when this physical location is determined to have changed. This alert can for example be used to prevent further usage of the femtocell basestation, or to restrict the available services.

Further, since the femtocell basestation is intended to operate with low power, and hence with a short range (for example in the range 10 m-25 m), the physical location of the femtocell basestation that has been determined gives an estimate of the location of any mobile device that has a connection to the femtocell basestation, and this estimate is sufficiently accurate for most purposes.

More specifically, in one embodiment of the invention, the radio network 12 includes an SMLC (Serving Mobile Location Center) 64, that is able to calculate the location of the femtocell basestation or the connected mobile device, as described in more detail below. Further, the core network 10 includes a GMLC (Gateway Mobile Location Center) 66 that is able to store and retrieve location information.

Figure 2:
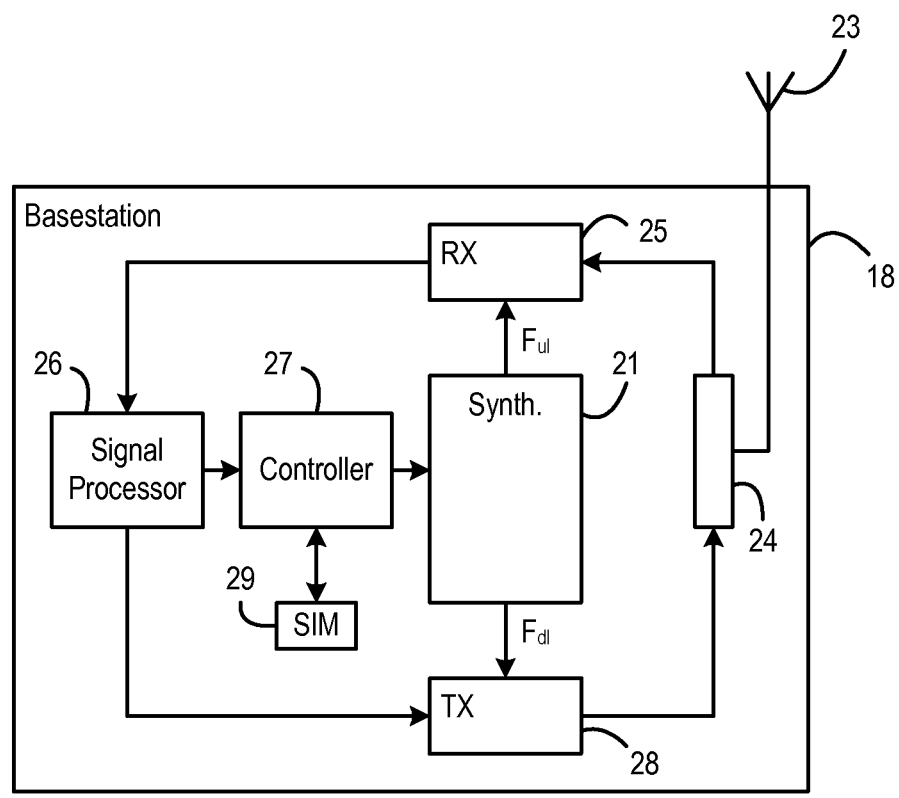
FIG. 2 is a block schematic diagram of a basestation in accordance with an aspect of the present invention.

FIG. 2 is a schematic diagram, illustrating in more detail the form of the basestation 18. The basestation has an antenna 23, connected to a duplexer 24. In the case where the cellular wireless network operates on the frequency division duplex principle, where each device can simultaneously transmit and receive radio frequency signals on a pair of frequencies having a known relationship, the duplexer is effectively a pair of matched filters that allow signals at the system downlink frequencies (that is, the transmit frequencies of the basestation 18) to be passed to the antenna 23, and allow signals at the system uplink frequencies (that is, the receive frequencies of the basestation 18) to be passed from the antenna 23.

In addition, in preferred embodiments of the present invention, the basestation 18 is also able to detect signals transmitted by other basestations, such as the basestations 16a, 16b, 16c, at allocated system downlink frequencies. For example, the basestation 18 may be provided with separate receiver circuitry, corresponding to the receiver circuitry conventionally found in a user device such as a mobile phone, or further means may be provided for allowing signals at the system downlink frequencies, received at the antenna 23, to be received in the basestation 18.

The basestation 18 includes a signal processor 26. In the case of signals for transmission by the basestation 18, the signal processor 26 receives the digital signals, converts them to the required format based on the communications standard used by the basestation, and passes the signals to transmit RF circuitry (TX) 28. As is generally conventional, the transmit RF circuitry 28 converts the signals to analog form, and upconverts them to the required radio frequency using an oscillator signal supplied by synthesizer circuitry 21 at a downlink frequency $F_{dl}$. The RF signals can then be passed through the duplexer 24 to the antenna 23 for transmission.

In the case of signals transmitted by a mobile device having a connection with the basestation 18, the signals are received at the antenna 23, and passed through the duplexer 24 to receive RF circuitry (RX) 25. As is generally conventional, the receive RF circuitry 25 downconverts the signals from the relevant radio frequency using an oscillator signal supplied by the synthesizer circuitry 21 at an uplink frequency $F_{ul}$, and converts them to digital form. The digital signals are then passed to the signal processor 26.

In accordance with the present invention, the basestation 18 uses information derived from signals transmitted by other network nodes, in particular the macrocell basestations 16a, 16b, 16c and/or any attached mobile phone 22 within the coverage area of the femtocell basestation 18, in order to optimize its own operation.

The basestation 18 operates under the control of a controller 27, to which is connected an interface 29 for a SIM card, or other module containing subscriber data. A suitable SIM card will typically be supplied to the customer on purchase of the basestation 18, and this SIM card can be used to identify the basestation 18 uniquely. As it can contain a SIM card, the basestation 18 can itself perform some of the functions of a user equipment, and can be recognized as a user equipment by the network.

There are various reasons why it may be necessary for the network to know the location of the basestation 18, and more specifically the location of the SIM card.

For example, when an emergency call is made by a mobile phone connected to the basestation 18, the mobile network operator should preferably be able to indicate the location of the calling device. Where, as here, the femtocell basestation 18 has only a short range (for example, the range may be approximately 25 m, or the femtocell basestation may provide coverage only within one particular building), it may be sufficient to provide the emergency services authorities with the location of the femtocell basestation.

Also, while the femtocell basestation 18 may be supplied to the customer by the mobile network operator together with a SIM card, and while it may be advantageous for that SIM card to be removable from the basestation 18, in the same way that SIM cards are typically removable from mobile phones, it may nevertheless be highly undesirable for the mobile network operator that the SIM card should be able to be inserted in a different basestation. Similarly, it may be highly undesirable for the mobile network operator that the basestation 18 should be operated from a non-approved location, for example outside the country where the mobile network operator has an operating license.

Figure 3:
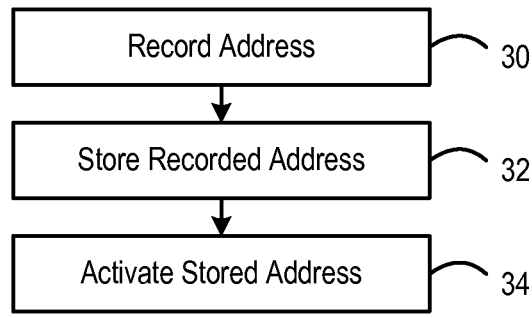
FIG. 3 is a flow chart, illustrating a first method in accordance with the present invention.

FIG. 3 is a flow chart, illustrating a first method for determining the location of the basestation 18. In step 30, when the basestation 18 is purchased by the customer, either in a retail outlet or remotely (for example, over the internet), an address is recorded. In step 32, this recorded address is stored in a database within the management system, and associated with data that uniquely identifies the basestation 18, such as the unique Network Interface Controller (NIC) number associated with the basestation 18, or the unique International Mobile Subscriber Identifier (IMSI) associated with the SIM card in the basestation 18 (if it can be assumed that the SIM card cannot be, or has not been, removed from the basestation 18).

In step 34 of the process, this stored address is activated when the basestation 18 first connects to the network, informing the mobile network operator that it is operational.

In some cases, it will be acceptable for the mobile network operator to use this stored address as the address at which the basestation 18 is in operation.

Figure 4:
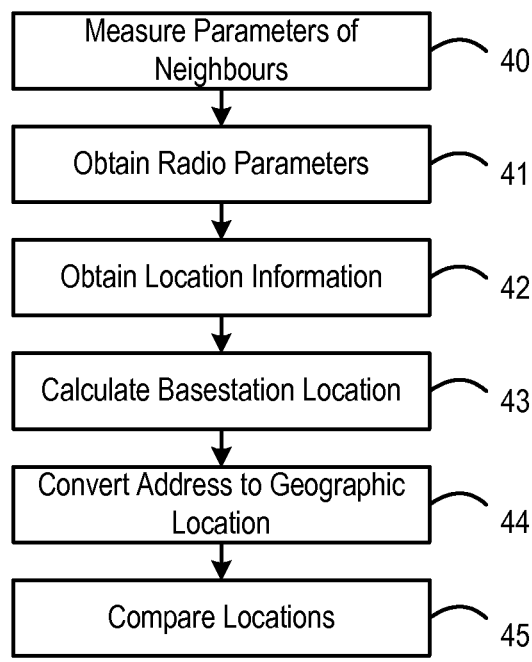
FIG. 4 is a flow chart, illustrating a second method in accordance with the present invention.

In order to provide a higher degree of confidence that the location of the basestation 18 is correct, additional steps can be taken, and FIG. 4 is a flow chart illustrating such a process. It will be apparent that certain steps of this process must be performed in the basestation 18, while other steps of the process must be performed in the management system 11 or another network node, while still further steps may be performed either in the basestation 18, or in the management system 11, or in another network node, as seems appropriate.

In step 40, the basestation 18 measures specified parameters in the signals transmitted from neighbouring basestations (for example the basestations 16a, 16b, 16c in the network illustrated in FIG. 1). For example, the measured parameters may relate to the strengths of specified signals transmitted by such neighbouring basestations.

The parameters to be measured may also include the cell-ID of each of the macrocells seen. This may only allow the location of the basestation 18 to be determined to a precision of a few kilometers, but this may be enough in some situations.

The basestation 18 may also detect the SFN-SFN observed time difference between detected signals. This can then be used according to the OTDOA (Observed Time Difference on Arrival) method to derive the location of the basestation 18.

Thus, the basestation 18 is able to identify the neighbouring basestations, and to obtain some information from the signals transmitted from those basestations. As mentioned above, the basestation 18 is preferably able to detect signals transmitted by other basestations, such as the basestations 16a, 16b, 16c, at allocated system downlink frequencies, either by interrupting its own transmissions, or by including separate receiver circuitry that is operational in parallel with the receiver circuitry used for handling calls.

In step 41, specified radio parameters are obtained from the macrocell basestations identified by the basestation 18 in step 40. For example, where the parameters measured in step 40 relate to the strengths of specified signals transmitted by the neighbouring basestations, the parameters obtained in step 41 may relate to the known powers with which such signals are transmitted by the neighbouring basestations. The basestation 18 may be able to obtain the radio parameters of neighbouring basestations operated by different operators and using different technologies such as GSM, UMTS, etc. In one example, these measured parameters are transmitted from the basestation 18 to the management system 11 for it to use in determining the location of the basestation 18.

Further, the locations of these macrocell basestations will be known to the mobile network operator, and will be stored in an appropriate form (for example in the form of geographic X-Y coordinates) in a database. In step 42, location information is therefore retrieved from the database for the macrocell basestations identified by the basestation 18 in step 40.

Based on this information, in step 43, the location of the basestation 18 can be calculated, or at least can be estimated to a sufficiently high degree of accuracy. For example, where the measured parameters of the signals relate to signal strengths, or relate to transit times of the signals, it is possible to calculate or estimate the distance of the basestation 18 from each of the neighbouring basestations from which such signals are detected. Then, provided there are at least three such neighbouring basestations, it is possible to use the well known technique of triangulation to calculate or estimate the location of the basestation 18 in the same geographic X-Y coordinates.

In step 44, the previously recorded operating address of the basestation 18, which may for example have been stored in the form of a street address or postal code, is converted to geographic coordinates in the same coordinate scheme.

In step 45, the geographic coordinates of the basestation, as derived in step 43, are compared with the geographic coordinates of the user address obtained in step 44. Appropriate action is then taken. If the derived geographic coordinates match the geographic coordinates corresponding to the recorded address, to within an acceptable tolerance, then it is assumed that the recorded address is correct. For many purposes, it is then convenient to record the location of the basestation 18 in the geographic coordinates.

If the derived geographic coordinates do not match the geographic coordinates corresponding to the recorded address, to within an acceptable tolerance, this implies that the basestation 18 is being used in a non-approved location. In such circumstances, an alarm signal may be sent to the mobile network operator, and it may be appropriate to discontinue service to the basestation 18 until its position changes again.

This process can be performed at regular intervals while the basestation 18 is active.

A determination as to whether the basestation 18 has changed its position can then be made by comparing some of the measured parameters, without needing to determine the position exactly on either occasion. For example, detecting the cell-ID of each of the detected neighbour macrocells at different times should still give the same list of neighbour macrocells, and a significant change may be due to a change in the position of the basestation 18. In such a situation, a significant change could perhaps also be due to a change in the network planning of the mobile network operator, and so the reliability of this technique is improved by detecting the cell-ID of each nearby macrocells in a plurality of mobile networks.

As mentioned above, another issue is that a SIM card could be removed from a basestation, such as the basestation 18 at one location, and then inserted in a different basestation at another location, potentially enabling the user to obtain the same services, to the possible disadvantage of the mobile network operator.

Figure 5:
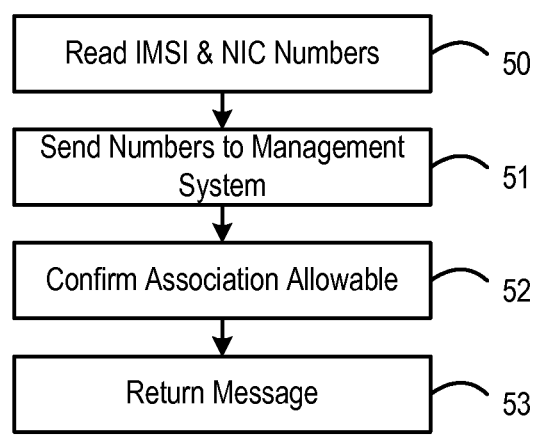
FIG. 5 is a flow chart, illustrating a third method in accordance with the present invention.

FIG. 5 is a flow chart, illustrating a mechanism for inhibiting the use of a SIM card in another basestation in such circumstances. The mechanism makes use of the unique Network Interface Controller (NIC) number associated with the basestation 18, and the unique International Mobile Subscriber Identifier (IMSI) associated with the SIM card in the basestation 18.

In step 50, the basestation 18 reads the IMSI number of the SIM and the NIC number. In step 51, it then associates these two numbers and sends them onto the management system 11.

In step 52, the management system 11 determines whether this association is allowable. For example, if an attempt is made to transfer the SIM from another basestation 18, for example at another location, this results in the new basestation informing the management system 11 of an association between its NIC number and the SIM IMSI. The management system 11 therefore checks to determine if the SIM IMSI is already associated with another NIC number. If the SIM IMSI is in fact already associated with another basestation, the management system 11 inhibits the use of this new basestation. For example, the management system 11 may send a message to the new basestation to send a SMS message to the user informing them that the basestation is locked and that they should contact the mobile network operator, which they could possibly be permitted to do through the basestation.

However, assuming that the association is allowable, in step 53 the management system 11 returns a message the basestation 18 that tells the basestation 18 to allow this particular SIM IMSI number to work only with the basestation having that particular NIC number, thereby locking them together.

For maintenance purposes there could be provided a maintenance SIM, which might need to be used in many basestations, and which would therefore be recognizable by each basestation, such that the basestation does not go through this SIM/NIC validation process when the maintenance SIM is inserted in the basestation.

The process shown in FIG. 4 relies on the basestation 18 detecting signals from neighbour basestations. However, in other situations, such measurements are not available, either because the basestation is not able to detect signals on system downlink frequencies, or because the macrocell coverage in the indoor environment of the basestation is inadequate. In that situation, the basestation can advantageously request, and receive, measurement reports from one or more mobile device connected to the basestation 18.

Then, the basestation 18 can assume that triangulation based on measurements from one or more of the mobile devices is reasonably accurate, for example because the mobile devices may be able to detect signals from a larger number of macrocells. For example, the mobile devices may be able to access GSM macrocell measurements, even when the basestation 18 is not, either because the GSM signal has better indoor coverage, or because the basestation 18 is able to detect signals on the UMTS system downlink frequencies but not on the GSM system downlink frequencies.

In addition, one of the mobile devices may be provided with satellite positioning system, such as GPS (Global Positioning System) or A-GPS (Assisted Global Positioning System) technology, in which case a highly precise position measurement may be available. Thus, the basestation 18 can request that any of the connected mobile devices provide it with its location, as determined by the GPS or A-GPS system, and the basestation 18 can then, as described above, use this location as an acceptably accurate estimate of its own location.

Moreover, when the basestation 18 already has an acceptably accurate knowledge of its own location, this can be used in order to provide to an A-GPS-equipped mobile phone the information (e.g. satellite information) that the mobile phone requires in order to be able to determine its own location more quickly than standard GPS would allow. For example, the basestation 18 can start from its registered address, which can be converted to geographical coordinates, and these can be used to determine the satellite information required by the mobile phone.

The basestation 18 can obtain a position detection by any of the methods described above, for example based on signals from one or more of the connected mobile devices, at a particular time, and can store this location until it is confident that a better signal is available.

There are therefore provided techniques for determining the location of a basestation 18 and its attached mobile devices.

The invention claimed is:

1. A basestation for a communications network, the communications network operating with separate downlink and uplink frequencies, wherein the basestation is operable periodically to interrupt its own transmissions to user equipment devices on said downlink frequencies in order to detect signals transmitted by neighbouring basestations on said downlink frequencies, such that the location of the basestation can be estimated based on the locations of neighbouring macrocell basestations from which said signals are detected, and such that, if the location of the basestation is changed to a non-approved location, an alarm is sent to the network.

2. The basestation as claimed in claim 1, operable such that, if the location is changed to an approved location, it is permitted to provide service.

3. A method of operation of a basestation for a communications network, the communications network operating with separate downlink and uplink frequencies, the method comprising: periodically interrupting transmissions of the basestation to user equipment devices on said downlink frequencies in order to detect signals transmitted by neighbouring basestations on said downlink frequencies, such that the location of the basestation can be estimated based on the locations of neighbouring macrocell basestations from which said signals are detected, and, if the location of the basestation is changed to a non-approved location, sending an alarm to the network.

4. The method as claimed in claim 3, further comprising, if the location is changed to an approved location, permitting the basestation to provide service.

5. The basestation as claimed in claim 1, wherein the basestation is configured to estimate its location by identifying said neighbouring basestations based on the detected signals transmitted by said neighbouring basestations, and by estimating its location based on known locations of said neighbouring macrocell basestations.

6. The basestation as claimed in claim 5, wherein the basestation is able to access a database containing the locations of said neighbouring macrocell basestations.

7. The basestation as claimed in claim 5, wherein the basestation is configured to estimate its location by triangulation from known locations of at least three of said neighbouring macrocell basestations.

8. The basestation as claimed in claim 7, wherein the basestation is configured to perform said triangulation based on signal strengths of the detected signals transmitted by said neighbouring basestations.

9. The basestation as claimed in claim 7, wherein the basestation is configured to perform said triangulation based on transit times of the detected signals transmitted by said neighbouring basestations.

10. The method as claimed in claim 3, wherein the basestation is configured to estimate its location by identifying said neighbouring basestations based on the detected signals transmitted by said neighbouring basestations, and by estimating its location based on known locations of said neighbouring macrocell basestations.

11. The basestation as claimed in claim 10, wherein the basestation is able to access a database containing the locations of said neighbouring macrocell basestations.

12. The basestation as claimed in claim 10, wherein the basestation is configured to estimate its location by triangulation from known locations of at least three of said neighbouring macrocell basestations.

13. The basestation as claimed in claim 12, wherein the basestation is configured to perform said triangulation based on signal strengths of the detected signals transmitted by said neighbouring basestations.

14. The basestation as claimed in claim 12, wherein the basestation is configured to perform said triangulation based on transit times of the detected signals transmitted by said neighbouring basestations.

* * * * *